A. THOMPSON.
REACH STRUCTURE FOR VEHICLES.
APPLICATION FILED JULY 15, 1916.
1,223,446.
Patented Apr. 24, 1917.
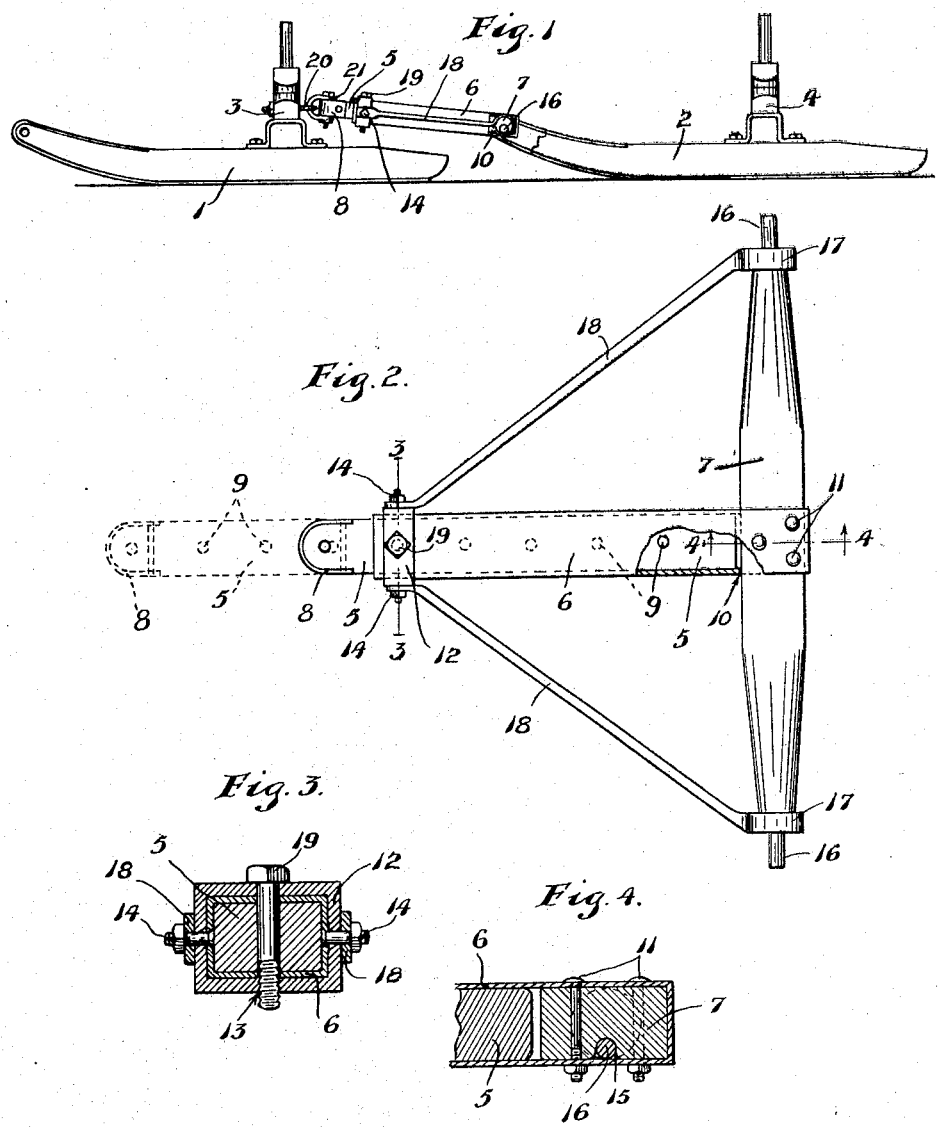

ered to the front bolster of a front sled, of a reach comprising a pair of telescopically connected members, the tubular member of the reach having a transverse opening through which the cross bar is inserted and rigidly secured to said member, and means for connecting the members of the reach in different longitudinal adjustments.

UNITED STATES PATENT OFFICE.

ANTON THOMPSON, OF PELICAN RAPIDS, MINNESOTA.

REACH STRUCTURE FOR VEHICLES.

1,223,446.  Specification of Letters Patent.  Patented Apr. 24, 1917.

Application filed July 15, 1916. Serial No. 109,544.

*To all whom it may concern:*

Be it known that I, ANTON THOMPSON, a citizen of the United States, residing at Pelican Rapids, in the county of Ottertail and State of Minnesota, have invented certain new and useful Improvements in Reach Structures for Vehicles; and I do hereby declare the following to be a full, clear, and exact description of the invention, such as will enable others skilled in the art to which it appertains to make and use the same.

My invention has for its object to provide an improved reach structure for vehicles and more particularly for bob-sleds; and, to this end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a side elevation of a bob-sled having the invention incorporated therein;

Fig. 2 is a plan view of the reach structure on an enlarged scale, some parts being broken away and sectioned and some parts being shown in different positions by means of broken lines;

Fig. 3 is a transverse section taken on the line 3—3 of Fig. 2, on an enlarged scale; and Fig. 4 is a longitudinal section taken on the line 4—4 of Fig. 2, on an enlarged scale.

The numerals 1 to 4, inclusive, indicate, respectively, the front and rear sleds and the front and rear bolsters of a hob-sled.

The improved reach structure comprises telescopically connected members 5 and 6 and a cross bar 7. The reach members 5 and 6 are rectangular in cross section and telescoped, the former into the latter. The reach member 5 is preferably made from a bar of wood with its front end rounded and reinforced by a metal strap 8. A multiplicity of holes 9 are bored vertically through the reach member 5.

The reach member 6 is open at its front end to telescopically receive the reach member 5 and has formed in its rear end a transverse opening 10, through which the cross bar 7 is inserted. Rivets 11 are inserted through the reach member 6 and cross bar 7 and rigidly connect the same. Surrounding the front end of the reach member 6 and closely fitting the same, is a rectangular metal collar 12, through which and the reach member 6 is a bore 13. Any one of the bores 9 in the reach member 5 may be moved into alinement with the bore 13. Nut-equipped bolts 14 are passed from the inside of the reach member 6 horizontally through each side thereof and the attached collar 12 and their heads are countersunk in said reach member 6, so as to not interfere with the telescoping movement of the reach member 5.

The cross bar 7 is of a length to just fit between the runners of the rear sled 2 and has in its bottom a longitudinal groove 15 in which is laid a metal rod 16. The ends of this rod 16 extend beyond the ends of the cross bar 7 and are seated in bores formed in the front end portions of the runners of the rear sled 2. Obviously, this rod 16 pivotally connects the reach members and the cross bar 7 to the rear sled 2 for vertical swinging movement. On each end of the cross bar 7, is a heavy ferrule 17 and with which ferrule is integrally formed a pair of converging tie rods 18, the free ends of which are bent laterally outward and bored to receive the bolts 14, which rigidly connect said brace rods to the reach member 6 and collar 12.

A bolt 19 is inserted through the alined bores 9 and 13 to connect the reach members 5 and 6 in different longitudinal adjustments. On the front bolster 3, is an eye 20 to which the front end of the reach member 5 is secured by a clevis 21.

In reach structures now commonly used for bob-sleds, it is necessary to notch or cut the rear bolster to receive the same and when the sleds are coupled up short the rear end of the reach projects for a considerable distance back of the bob-sled, which is very objectionable. By the use of my improved reach, the above objections are entirely done away with.

What I claim is:—

1. The combination with a cross bar adapted to be pivotally secured to the runners of a rear sled, of a reach comprising a pair of telescopically connected members, the tubular member of the reach having a transverse opening through which the cross bar is inserted and rigidly secured to said member, and means for connecting the members of the reach in different longitudinal adjustments.

2. The combination with a cross bar adapted to be pivotally secured to the runners of a rear sled, of a reach comprising a pair of telescopically connected members, the tubular member of the reach having a transverse opening through which the cross bar is inserted and rigidly secured to said member, means for connecting the members of the reach in different longitudinal adjustments, and brace rods connecting the cross bar and tubular member of the reach.

In testimony whereof I affix my signature in presence of two witnesses.

ANTON THOMPSON.

Witnesses:
H. L. OPSAHL,
HARRY D. KILGORE.

Copies of this patent may be obtained for five cents each, by addressing the "Commissioner of Patents, Washington, D. C."